(No Model.)
J. C. GIBSON.
CLUTCH.
No. 505,219. Patented Sept. 19, 1893.
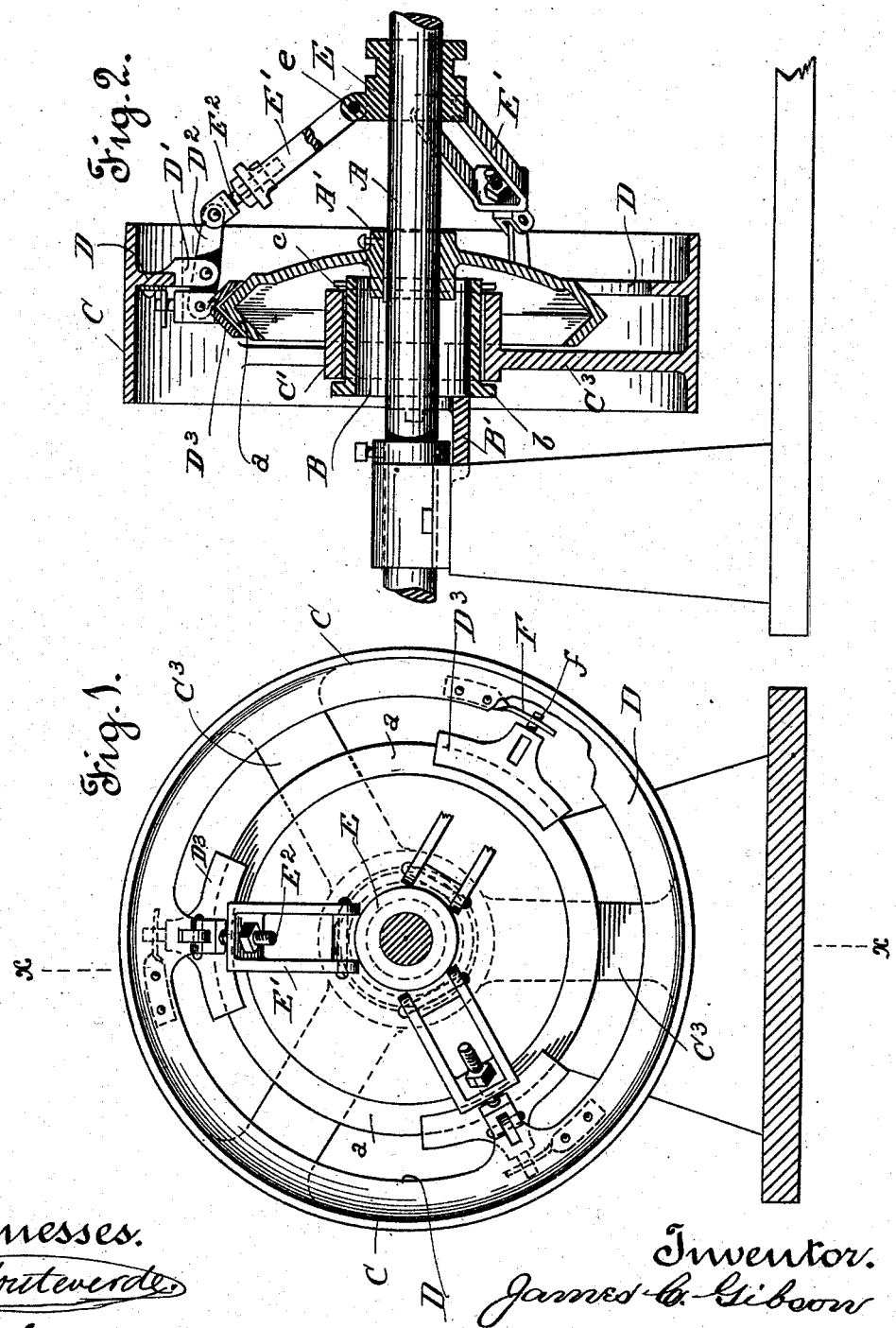
Witnesses.
F. C. Monteverde
M. G. Loezler
Inventor.
James C. Gibson
By W. A. Acker
Atty

UNITED STATES PATENT OFFICE.

JAMES CHARLES GIBSON, OF SAN FRANCISCO, CALIFORNIA.

CLUTCH.

SPECIFICATION forming part of Letters Patent No. 505,219, dated September 19, 1893.

Application filed April 26, 1892. Serial No. 430,806. (No model.)

*To all whom it may concern:*

Be it known that I, JAMES CHARLES GIBSON, a citizen of the United States, residing in the city and county of San Francisco, State of California, have invented an Improvement in Friction-Clutch Pulleys; and I hereby declare the following to be a full, clear, and exact description of the same.

The present invention relates to an improved friction clutch pulley, and the object thereof is to construct the pulley so that when the device is not in use the weight of the pulley wheel will be thrown from off the operating shaft, in order to release same of the strain thereof, and the wheel and clutch mechanism remain idle, although the shaft continues to rotate, thus permitting the repairing or adjusting of the clutch mechanism without necessitating the stoppage of the shaft, all as will be hereinafter more fully set forth and described.

Referring to the drawings forming a part of this application for a more complete understanding of my invention, Figure 1, is a side elevation of my pulley with its connecting mechanism; and Fig. 2, is a vertical sectional view taken on line $x$—$x$—, Fig. 1.

The letter A is used to indicate the operating shaft, which is secured and works in the usual manner, having affixed thereto and rotating therewith a driving disk or wheel A', provided with a V-shaped rim $a$. This hub may be keyed or otherwise connected to the shaft A. The operating shaft rotates within the sleeve B, cast or secured to the back plate B', which plate is designed to be fastened to a post or hanger. This sleeve is provided with an upwardly extending annular flange or collar $b$. The said sleeve does not rotate with the shaft, and is used as a support for the pulley wheel when not in use.

The rim of the pulley wheel is designated by the letter C, and said rim is connected to the central open hub C', by means of arm $C^3$. The open hub C', fits loosely over the sleeve B, which is of slightly less diameter than the interior of the central hub, and is held in place thereon by the annular flange $b$, and pin or set collar $c$. By causing the central hub C' to fit loosely upon sleeve B, the same will be raised clear thereof when the pulley wheel is thrown into frictional engagement with the V-shaped rim of the driving disk or wheel, as hereinafter set forth, in order to overcome friction which would result in case the said hub rotated directly upon the spindle.

The rim C, of the wheel is cast with an inwardly projecting flange D, which carries a series of bifurcated lugs D'. Within the bifurcated portion of these lugs, I secure or fulcrum the levers $D^2$, each of which levers has a driving shoe $D^3$, connected to the inner end thereof. The under faces of these shoes are cut or cast to correspond with the outer rim of the driving disk or wheel A. It is obvious, inasmuch as the driving disk or wheel rotates with the operating shaft, that when the shoes are thrown into contact with the driving disk or wheel, the friction thereof will serve to drive the wheel. While the outer rim of the driving disk or wheel and under faces of the driving shoes may be cast in any corresponding shape, I prefer to make the same V-shaped, for the reason that I obtain a much better frictional contact surface. It will thus be seen that the shoes and fulcrumed levers constitute the gripping device for throwing the wheel in or out of frictional engagement with the driving hub. Said gripping device is thrown in or out of frictional engagement through the medium of the sleeve E, which slides loosely on the operating shaft A, to or from the driving hub. This sleeve is not keyed or in any manner fastened to said shaft, and is only rotated therewith when the gripping device is thrown into frictional engagement with the rim of the driving disk or wheel. The sliding sleeve is connected to the lever $D^2$, by the regulating link E', one end of which is secured to the sleeve E, by pin $e$, while the opposite end is fastened to outer end of lever $D^2$, by the adjustable screw-bolt $E^2$.

By means of the adjustable screw-bolt, which constitutes a part of the link E', the distance between movable sleeve and outer end of lever may be increased or decreased. By this manner of connecting the sleeve and gripping device, which forms the clutch mechanism, to the pulley, it will be seen that when the pulley wheel is idle, the clutch mechanism likewise remains idle, or stationary, and does not revolve with the shaft, consequently permitting of the same being easily repaired or adjusted without shutting down the machinery for the purpose of stopping rotation of the shaft. Supposing the shaft to be rotating and it is desired to cause the belt pulley to be set in motion, it is only necessary to throw the sleeve E, inward, upon the operating shaft, toward the driving disk or wheel, which inward movement of the sleeve will cause the connecting link to assume a vertical position, which forces the outer end of fulcrumed lever upward and inner end downward, until the shoes bear firmly against the rim of the driving disk or wheel, which will cause the pulley wheel to be carried around with the movement of the said disk or wheel, by reason of the frictional contact between the shoes and rim of driving disk or wheel. As this contact between the shoes and driving disk or wheel is being made, the center hub of the pulley wheel is raised from contact with the stationary sleeve B.

In order to release or stop the rotation of the belt pulley, the sleeve E', is thrown outward, which, through the medium of connecting link, draws the outer end of fulcrumed lever downward, hence raising the inner end and lifting the shoe from contact with the driving disk or wheel, consequently permitting the wheel to lower until the inner face of the hollow hub rests upon the supporting sleeve.

In order to insure the direct raising and lowering of the shoes, with the movement of the sleeve, I secure to the inner face of the flange D, the perforated guide plate F, through which extends and works the stud or pin $f$, radially projecting from the driving shoe.

Having thus described my invention, what I claim as new, and desire to secure protection in by Letters Patent of the United States, is—

1. In a friction clutch pulley, the combination with the operating shaft, a driving disk secured to and rotating therewith, a stationary sleeve through which the shaft extends, a pulley wheel having its hub, fitting over said spindle, a flange inwardly projecting from the rim of the wheel, levers fulcrumed to said flange, the friction shoes attached to the inner end of the levers, said shoes designed to engage with rim of the driving disk, of the sleeve loosely mounted upon the operating shaft, and of suitable mechanism forming connection between the fulcrumed levers and movable sleeve.

2. In a friction clutch pulley, the combination, with the operating shaft, a driving disk secured to and carried by the shaft, the pulley wheel supported when idle independent of the shaft, the friction shoes for engaging rim of driving disk, the levers for radially moving the shoes, and the sleeve loosely mounted upon the operating shaft, of suitable device forming connection between sleeve and gripping lever for operating the friction shoes, in order to throw the shoes in or out of contact with the driving disk.

3. In a friction clutch pulley, the combination with the operating shaft carrying a driving disk, the pulley wheel, the supporting sleeve for holding the wheel independent of the shaft when same is idle, shoes for engaging with the driving disk, of mechanism for throwing the shoes in or out of engagement, and of the sleeve loosely working on the operating shaft, said shoes, operating mechanism and sleeve forming connection with the rim of the pulley wheel, so that when the wheel is idle, the shoes and operating mechanism and sleeve will likewise remain idle.

4. In a friction clutch pulley, the combination, with the operating shaft, a driving disk secured to and carried by the shaft, the pulley wheel, when idle, supported independent of the operating shaft, gripping mechanism secured to and carried by said pulley wheel, said mechanism being adapted to frictionally engage with the driving disk, the sleeve loosely mounted upon the operating shaft, of suitable devices forming connection between the sleeve and gripping mechanism of the wheel, said devices and gripping mechanism remaining idle with the wheel.

San Francisco, April 4, 1892.

JAMES CHARLES GIBSON.

Witnesses:
ASA R. WELLS,
A. L. FISH.